(12) United States Patent
Ruan et al.

(10) Patent No.: US 7,848,486 B2
(45) Date of Patent: Dec. 7, 2010

(54) INTEGRATED SYSTEM AND INTEGRATING METHOD FOR RADIOACTIVE MATERIAL DETECTION AND X-RAY RADIATION IMAGING

(75) Inventors: Ming Ruan, Beijing (CN); Zhongqi Pu, Beijing (CN); Kun Zhao, Beijing (CN); Jun Lv, Beijing (CN); Xiaobing Wang, Beijing (CN); Zhe Xin, Beijing (CN); Gaofeng Miao, Beijing (CN); Yu He, Beijing (CN)

(73) Assignee: Nuctech Company Limited, Beijing (CN)

( * ) Notice: Subject to any disclaimer, the term of this patent is extended or adjusted under 35 U.S.C. 154(b) by 87 days.

(21) Appl. No.: 12/404,469

(22) Filed: Mar. 16, 2009

(65) Prior Publication Data

US 2009/0252289 A1  Oct. 8, 2009

(30) Foreign Application Priority Data

Mar. 18, 2008  (CN) .................. 2008 1 0102140

(51) Int. Cl.
*G01N 23/04* (2006.01)
(52) U.S. Cl. .......................... 378/62; 378/57
(58) Field of Classification Search .............. 378/4, 378/57, 62, 64, 65, 98.8
See application file for complete search history.

(56) References Cited

U.S. PATENT DOCUMENTS

| | | | |
|---|---|---|---|
| 7,239,245 B2 * | 7/2007 | Kang et al. .............. | 340/600 |
| 2005/0029460 A1 | 2/2005 | Iwatschenko-Borho et al. | |
| 2005/0105681 A1 | 5/2005 | Kang et al. | |

| | | | |
|---|---|---|---|
| 2009/0140159 A1 | 6/2009 | Tomita et al. | |

FOREIGN PATENT DOCUMENTS

| | | |
|---|---|---|
| CN | 1598553 A | 3/2005 |
| CN | 201043956 Y | 4/2008 |
| CN | 201196635 Y | 2/2009 |
| CN | 201196636 Y | 2/2009 |
| WO | WO 2007/108279 A1 | 9/2007 |

OTHER PUBLICATIONS

International Search Report in PCT/CN2009/000289 dated Jun. 25, 2009.

* cited by examiner

*Primary Examiner*—Irakli Kiknadze
(74) *Attorney, Agent, or Firm*—Marshall, Gerstein & Borun LLP

(57) ABSTRACT

The present invention relates to the fields of radioactive material detection and X-ray radiation imaging inspection, and provides a system and method for performing radioactive material detection and X-ray radiation imaging inspection simultaneously at the same place, thereby solving the problem that the two means have to be conducted separately, as in the prior art. The integrated system of the invention comprises: an X-ray NII system for performing X-ray radiation imaging inspection on the object under examination; a radiation monitor placed adjacent to the X-ray NII system device to detect the radioactive rays emitted by the object under examination; the radiation monitor sets, within the detection energy region thereof, a lower limit of detection to distinguish the energy region of the detected X-rays emitted by the X-ray detection device from the energy region of the radioactive rays emitted by the object under examination, and detects the energy in the energy region higher than said lower limit of detection. The present invention realizes a compact integration of the two devices, and greatly saves space and time resources.

20 Claims, 2 Drawing Sheets

INTEGRATED SYSTEM AND INTEGRATING METHOD FOR RADIOACTIVE MATERIAL DETECTION AND X-RAY RADIATION IMAGING

CROSS-REFERENCE TO RELATED APPLICATIONS

This application claims the benefit of Chinese Patent Application No. 200810102140.4, filed Mar. 18, 2008.

TECHNICAL FIELD

The invention generally relates to the field of article examination, in particular to the fields of radioactive material detection and X-ray scanning.

BACKGROUND ART

The radiation monitor has been widely used at the exits and entrances of customs, borders, airports, nuclear power plants and other important places for preventing illegal transport of radioactive materials. A prior art radiation monitor detects the Gamma and neutron rays emitted by the radioactive materials/special nuclear materials when they are passing through the monitor, and determines whether an object under examination contains radioactive materials/special nuclear materials according to the abnormal changes of the count rate or the spectrum of the system caused by the Gamma and neutron rays.

Besides radioactive material monitoring, the incoming or outgoing articles at the entrances and exits of an important place are also performed with X-ray Non Intrusive Inspection (NII). A prior art NII system uses an X-ray machine as a radiation source, detects the dosage of X-rays that penetrate an object under examination when the object passes through, obtains the mass thickness and image information of the object according to the change of detected penetrated dosage, and thereby determines whether a dangerous article is contained.

The above-mentioned radiation monitor and NII system can perform their respective functions in different fields of examination, but a problem exists that they cannot be put adjacent to each other to perform radioactive material monitoring and X-ray detection on the same object. The reason lies in that when performing X-ray radiation imaging examination on an object under examination, the X-ray NII system will emit a lot of X-rays, wherein some of these X-rays will leak to the adjacent radiation monitor. Since the radiation monitor judges whether the passed object under examination contains radioactive materials just by detecting rays, the leaking X-rays from NII system will affect the precision of detection of the radiation monitor and make it unable to correctly judge whether the detected abnormal radiation is caused by any radioactive material or by the NII system. Moreover, since said radiation monitor and the X-ray NII system cannot be put adjacent to each other, goods have to be transported between the radiation monitor and the X-ray NII system at the customs of the airports or the seaports, which results in a great waste of manpower, resources, space and time.

SUMMARY OF THE INVENTION

In view of the defects existing in the prior art as mentioned above, it is desirable to provide an integrated system which can perform radioactive material detection and X-ray inspection simultaneously at the same place.

By appropriately setting the lower limit of detection and adopting a digital filtering technique, the present invention solves the problem of integration of the radiation monitor and the X-ray NII system.

According to one embodiment of the present invention, a system for performing radioactive material detection and X-ray inspection on an object under examination is provided, which comprises: an X-ray NII system for performing X-ray radiation imaging inspection on the object under examination; a radiation monitor placed adjacent to the X-ray NII system to detect the radioactive rays emitted by the object under examination; the radiation monitor sets, within the detection energy region thereof, a lower limit of detection to distinguish the energy region of the leaking X-ray by the X-ray NII system from the energy region of the radioactive rays emitted by the object under examination, and detects the count or spectrum of rays in the energy region higher than said lower limit of detection.

According to another embodiment of the invention, a method for performing radioactive material detection and X-ray radiation imaging inspection on an object under examination is provided, which comprises: using an X-ray NII system to perform X-ray radiation inspection on the object under examination; using a radiation monitor to detect the radioactive rays emitted by the object under examination; placing the X-ray NII system adjacent to the radiation monitor; setting, within the detection energy region of the radiation monitor, a lower limit of detection for distinguishing the energy region of the leaking X-ray by the X-ray NII system from the energy region of the radioactive rays emitted by the object under examination, and detecting the count or spectrum of rays in the energy region higher than said lower limit of detection.

By means of the above solutions, an compact integration of an X-ray NII system and a radiation monitor is realized, so that X-ray radiation imaging inspection and radiation monitor can be performed at the same place, which greatly saves spaces and time at customs of the airports and the seaports, and further avoids the waste in manpower and other resources caused by transportation of goods between the radiation monitor and the X-ray NII system.

DESCRIPTION OF THE DRAWINGS

The specific embodiments will be described below in detail in conjunction with the drawings, wherein the same reference sign denotes the same component.

PREFERRED EMBODIMENTS

Figure 1:
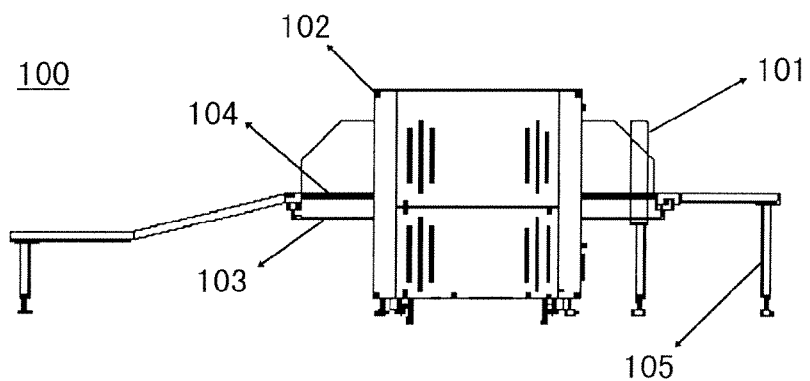
FIG. 1 is a side view of a system for detecting radioactive material and performing an X-ray inspection on an object according to one embodiment of the invention.

FIG. 1 is a side view of a system 100 for detecting radioactive material and performing an X-ray inspection on an object according to one embodiment of the invention, wherein reference sign 101 denotes radiation monitor for detecting the Gamma or neutron rays emitted by the object under examination. 102 denotes an X-ray NII system for performing X-ray radiation imaging inspection on the object under examination. In the system 100, the radiation monitor 101 is placed at both sides of the entrance of the X-ray NII system 102, but those skilled in the art will also conceive to place it at both sides of the exit of the X-ray NII system 102, or at one side of the entrance or the exit of the X-ray NII system 102, or above or under the X-ray NII system 102. 103 denotes an objective table for carrying the object under examination. 104 denotes a track for forwarding the object under examination from the location of receiving radioactive material monitoring to pass through the X-ray NII system 102. 105 denotes a backbone for supporting the objective table 103.

Figure 2:
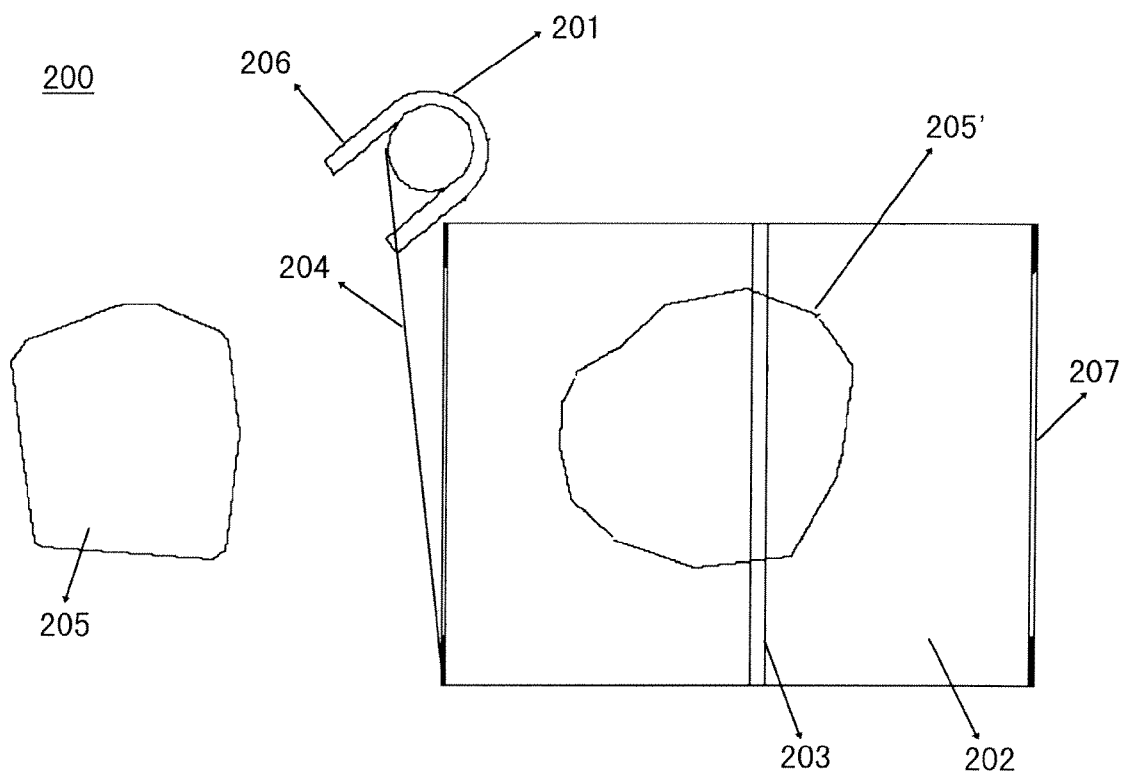
FIG. 2 is a top view of the system for detecting radioactive material and performing an X-ray inspection on an object as shown in FIG. 1.

FIG. 2 is a top view of the system for detecting radioactive material and performing an X-ray inspection on an object as shown in FIG. 1, which is denoted, in general, by reference sign 200. In FIG. 2, reference sign 201 denotes a radiation monitor that is the same as the one in FIG. 1. 202 denotes an X-ray NII system that is the same as the one in FIG. 1. 203 denotes X-rays that are emitted in the X-ray detection device 202 and are collimated. When the X-ray NII system 102 is used to conduct examination, it continuously emits X rays which include very strong fan-shaped primary X rays at the center, and said fan-shaped primary X rays are collimated into X rays 203 by a collimator. When the X rays are collimated and transmit through the object under examination and during the detection by the detector, a great amount of scattered rays are formed, which might, in the prior art, affect the precision of detection of the nearby radiation monitor 201. 204 denotes a lead curtain for blocking some of said scattered rays. 205 denotes the object under examination, and 205' denotes the object under examination that is at the location for receiving X-ray detection. 206 denotes a first shield that partially surrounds the radiation monitor 201. 207 denotes a second shield that at least partially surrounds the X-ray NII system 202.

In the embodiment shown in FIG. 2, the cross-section of the X-ray NII system 202 is a rectangle, which is completely surrounded by the second shield 207. The radiation monitor 201 and the first shield 206 are placed at one side of the entrance of the X-ray NII system 202. Said first shield 206 is in the shape of a horseshoe, the arc end of which surrounds the radioactive material monitoring device 201, and the axis of the opening thereof is at an angle of, e.g. 45°, with the delivery direction of the object under examination. Moreover, the two arms of the opening portion extend outside from the arc portion to ensure that no scattered rays that are emitted by the X-ray NII system 202 when all the lead curtains 204 are in a naturally vertical state, or excited X fluorescent rays/the leaked scattered rays will not reach the radiation monitor 201. Preferably, the first shield 206 can also at least partially shield the natural background rays to improve the system sensitivity. Meanwhile, the opening also ensures that there is an enough field angle for the object 205 under examination so as to correctly detect the Gamma and neutron rays emitted by the object 205 under examination. Said field angle, or field of vision, is associated with the speed of examination on the object by the X-ray NII system 202, that is, the field angle is appropriately increased when the speed is high, while the field angle may be appropriately decreased when the speed is low. In this embodiment, an angle of 45° is used as an example, but of course, those skilled in the art may easily conceive to use other angles, such as an angle between 30-60°, to achieve the same technical effect. Similarly, the ordinary one skilled in the art will easily conceive to place the radiation monitor 201 and the first shield 206 at both sides of the entrance or exit of the X-ray NII system 202 or place them above or below the X-ray NII system 202, which will ensure a smooth delivery of the goods under examination without influence, and will occupy no outside ground. Any angle and position of placement will do as long as the first shield 206 can shield the scattered rays on the lead curtain. A plurality of radiation monitor 201 and first shields 206 placed at different positions and angles can be used at the same time, as long as they can shield the scattered rays on the lead curtain and have enough field angles to detect the Gamma and neutron rays emitted by the object 205 under examination. In addition, besides a horseshoe shape, the first shield 206 can also be implemented in a C shape or in any surrounding shape with an opening at one side, such as polygons like a rectangle.

In a preferred embodiment, the first shield 206 and the second shield 207 are made of heavy metal materials. Since neutron can well penetrate heavy metals, forming the first shield 206 and the second shield 207 with heavy metal materials can not only well shield the X-rays but also realize no or little influence on the detection sensitivity for neutron.

Figure 3:
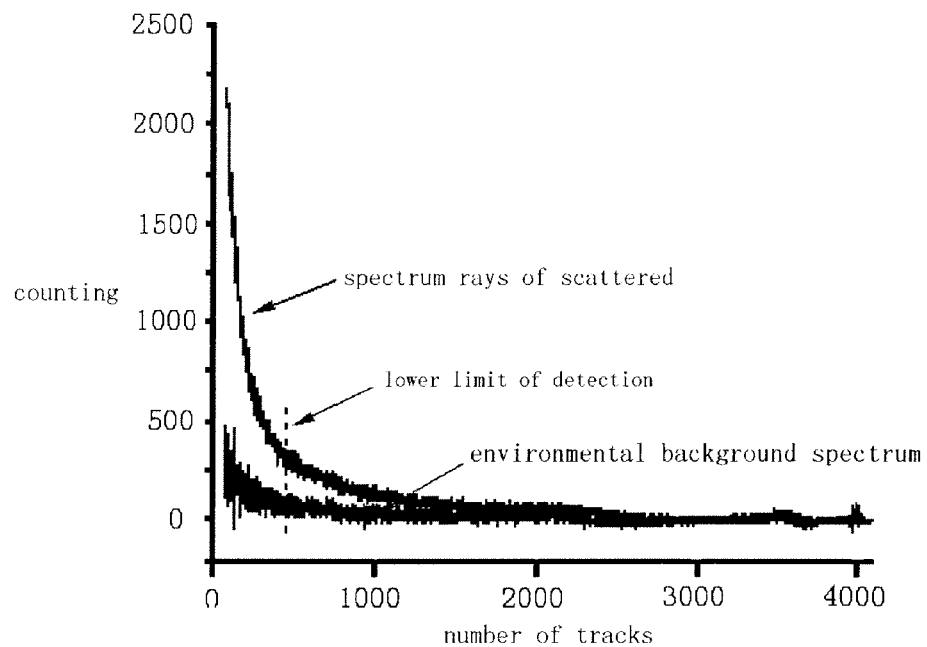
FIG. 3 shows the scattering spectrum obtained by a multi-channel analyzer (MCA) when a radiation monitor is working under an environmental background.

The following texts will illustrate, with reference to FIG. 3, the scattered rays' influence on the radiation monitor is reduced by raising the detection lower limit of an amplifier or the multichannel. When the Gamma and/or neutron rays emitted by radioactive materials are incident on the radiation monitor 201, they interact with the detector material in the radiation monitor 201 and are converted into an electrical pulse signal to be output; said electrical pulse signal undergoes linear amplification, shaping and data collection, etc., and may be recorded by the system according to the count rate, or may be recorded as spectrum according to the amplitude of the signal. FIG. 3 shows the scattering spectrum obtained by multichannel analyzer (MCA) when the radiation monitor 201 is working with an environmental background, wherein the horizontal axis represents the number of tracks and the longitudinal axis represents the counting.

Figure 4:
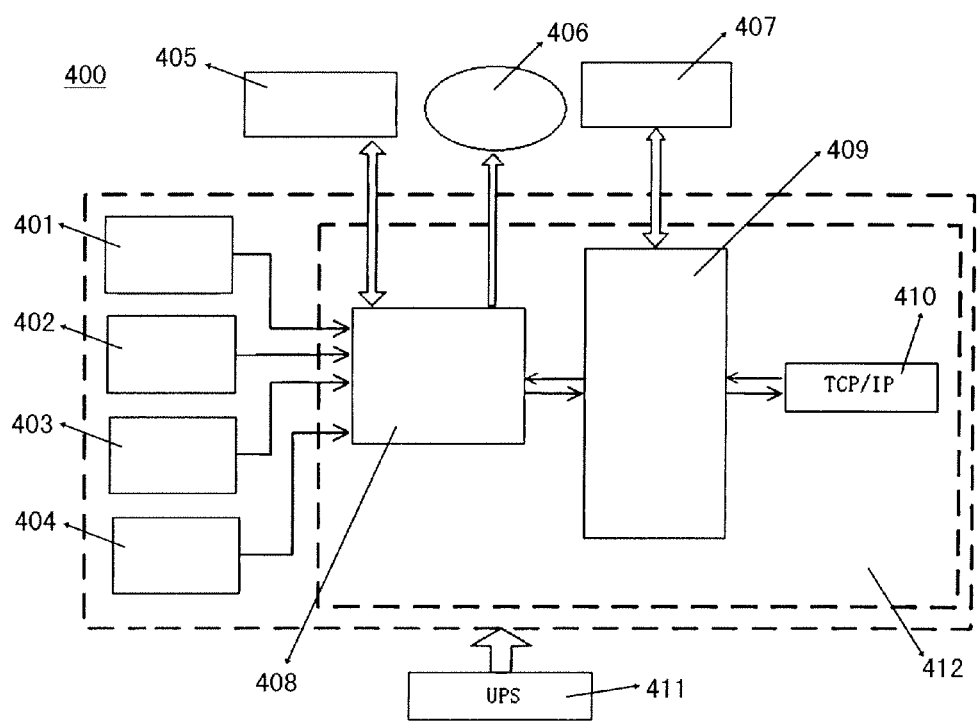
FIG. 4 is a block diagram showing a specific construction of a radiation monitor.

FIG. 4 is a block diagram showing a specific construction of a radiation monitor, which is generally denoted by reference sign 400 in FIG. 4. radiation monitor 400 mainly comprises: a Gamma detecting module 401, a neutron detecting module 402, an occupancy/speed detector 403, a gate control detector 404, a temperature control assembly 405, a sound and light alarm 406, a video monitor 407, a means 408 for signal transmission and control, a computer 409, a TCP/IP module 410, and a USP power supply 411, wherein the means 408 for signal transmission and control, the computer 409, and the TCP/IP module 410 are included in a data acquiring and processing sub-system 412. The Gamma detecting module 401 is consisted of a highly sensitive scintillator (e.g. Plastic scintillator, NaI(TI) crystal and so on), a low noise photomultiplier, a high voltage, amplifier, etc., and is used for detecting Gamma rays and transmitting the signals thereof to the data acquiring and processing sub-system 412. The neutron detecting module 402 is consisted of an optimized and moderated body structure, an He-3 proportional neutron tube, a high voltage, amplifier, etc., and is used for detecting neutrons and transmitting the signals thereof to the data acquiring and processing sub-system 412. The occupancy/speed detector 403 is consisted of opposite-type infrared sensors mounted on opposite detecting posts and is used for learning whether any object under examination passes through the monitored area. The data acquiring and processing sub-system 412 is consisted of an embedded system of an advanced instruction simplifying system processor (ARM) and a counter or multichannel analyzer, and is used for collecting and processing data, judging whether an abnormal ray counting rate or abnormal spectrum occurs, and producing the relevant alarm information. A set of alarm algorithms is formed by processing and calculating the relevant data using software, condition modification, logic judgment, etc., and the user interface and information preservation software. The gate control detector 404, temperature control assembly 405, sound and light alarm 406, video monitor 407, means 408 for signal transmission and control, computer 409, TCP/IP module 410, and USP power supply 411 are functional modules in the prior art, so for the sake of concision, the specific construction thereof will not be elaborated herein. Those skilled in the art will understand that the functional modules can be increased or reduced as actually desired.

When radioactive materials pass through the monitor and the detected count rate or spectrum is abnormal, it can be determined that the object under examination contains radioactive materials. In order to effectively monitor radioactive materials, the radiation monitor 201 needs to determine the count rate alarm threshold and/or the limit of ray spectrum variation according to the environmental background of the system so as to meet the requirements on sensitivity, precision, monitoring speed and false alarm rate of the system. The count rate or the peak area of the spectrum measured by the monitor complies with physical statistical rules, that is, in a relatively stable environment and under a condition of no (or relatively little) electronic noise being recorded, the count rate or peak area of the previous period of time that is already known can be used to predict the probability of appearance of the count rate or area in the next period of time, generally speaking, the probability of appearing outside 5 sigma is far less than 0.1%, so the alarm threshold is substantially set at 5 sigma, which satisfies the level of false alarm rate required by almost all standards, and said threshold also becomes the sensitivity of the system. When the next count rate or peak area is equal to or greater than the previous (or average or prior-occupancy) count rate or peak area plus 5 sigma thereof, an alarm is generated. Likewise, if the true value of the detected count rate or peak area of the ray of a radiation source is 5 sigma of the current background count rate or peak area (corresponding area), and the system threshold is set at 5 sigma, then the accuracy of detection of said source is 50% according to statistical rules, which is also the requirement of general standards; similarly, according to the statistical rules, indexes like sensitivity are associated with factors like the time of detection and the moving speed of the object. When the object under examination passes through the radiation monitor 201, and if the measured ray count rate or spectrum variation degree is higher than a pre-set value, the radiation monitor 201 outputs alarm information. The type and specific nuclide of the radioactive material can be identified according to the ray energy characteristics (spectrum) detected by the monitor. Specifically, the spectrum is a two-dimensional spectrum recorded according to the magnitude of the detected ray energy, if the spectrum meter is energy calibrated in advance, for example, 241 Am (characteristic energy 59 KeV . . . ), 137Cs (characteristic energy 661.6 KeV . . . ), 60Co (characteristic energy 1173.2 KeV, 1332.5 KeV) are used, then the energy corresponding to the full energy peak thereof is known; for an unknown source, if a peak appears in the spectrum or a peak position is obtained by mathematical spectrum unscrambling, and is converted into energy through scale coefficient, then the source nuclide of said peak is known. Of course, many nuclides have multiple characteristic peaks and the branch ratio thereof is fixed, but owing to such factors as self-absorption, detection efficiency, shielding, interference, multiple nuclides overlapping, etc., the difference between the detected peak area ratios will be great.

Referring back to FIG. 3, the gray spectral lines in the lower part of the figure are the environmental background spectrum, which are mainly composed of the cosmic rays and the natural radioactive materials in the environment. The black spectral lines above the gray ones are the spectrum detected by the radiation monitor 201 when working with the environmental background and the X-ray detection device 202 without the shield of a lead curtain. In the black spectrum, a high count rate appears at the lower track, i.e. at the low energy region. This is because the scattered rays have lost a lot of energy after one or several times of scattering in the X-ray NII system 202, and as a result, the energy thereof mainly centers around in the low energy region. If the object under examination contains radioactive materials, the ray energy thereof will usually be higher than the low energy region as shown in the figure. That is to say, the energy of ray emitted by the object under examination and the X-ray scattered rays are in different energy regions.

According to one embodiment of the invention, a lower limit of detection (LLD) is set at the inflexion from the high count rate to the steady low count rate on the black spectrum curve. The lower limit of detection is set flexibly and dynamically by a digital circuit according to the ray energy ranges of specific detectors and the indexes of sensitivity. The lower limit of detection can be determined according to the determined energy limit. Specifically, in the calibrated spectrum, the energy corresponds to the number of channels of the MCA, so a determined lower limit of detection can be obtained from the determined energy limit. In the general standards, there are different requirements on the sensitivity of detection of different sources, while the sensitivity is dependent on the count rate of the background or the area of the corresponding interval, so to meet the requirement on the sensitivity of corresponding sources, the lower limit of detection can be adjusted accordingly. For example, the characteristic peak of 60Co is above 1 MeV, so with respect to the counting system, its sensitivity of detecting the 60Co source can be improved by increasing the lower limit of detection and reducing the background count. Meanwhile, the count rate and spectrum of the system that operates in the background and that includes an operating X-ray NII system in the detection energy region can be determined, besides, the difference between the sensitivity of the system detecting said energy region and the sensitivity of the system when the X-ray NII system is not operating can be calculated. By setting the lower limit of detection, the radiation monitor 201 will not record the low-energy scattered rays that are lower than said lower limit of detection, but it will record only the high-energy radioactive rays, thereby reducing the scattered rays' influence on the radioactive material monitoring.

When the X-ray NII system operates, the scattered rays may accumulate to the high energy region because of the opening of the lead curtain, the incoming and outgoing of goods and the differences in the size and quality of goods, thus causing a distortion of the count rate and the spectrum shape, which brings difficulties to the setting of the lower limit of detection. FIG. 3 shows that in the part of the lower energy region that represents the energy of the scatter rays, the black spectrum is a smooth spectrum that is continuous, without distinct characteristic peak and declines exponentially. However, the ray spectrums of all radioactive materials should be spectrums having characteristic peaks and certain structures. Thus, with respect to the radiation monitor using a MCA to detect the spectrum of the radioactive rays emitted by the object under examination, the continuous and smooth background spectrum including the scattered rays can be filtered out by performing such technical processing as digital filtering, smoothing, energy scaling, spectrum unscrambling on the black spectrum, thereby reducing the scattered rays' influence on the radioactive material monitoring. The digital filtering technique includes many forms, for example, a high pass low cut filter F( ) can be designed for transforming the spectrum, e.g. Bj=F (Ai) i=1, 2, 3, . . . 1024, where Ai is the originally obtained spectrum, Bj is the filtered spectrum. The energy resolution of the rays detected by the detector is fixed and known (by calibration), so the spectrum of the selected filter is known. When the setting of the lower limit of detection is supplemented by said digital filtering technique, the difficulty of spectrum descrambling, peak searching and peak recognition can be reduced.

Those skilled in the art will conceive to apply the solution of shielding X-rays using heavy metal materials to various embodiments. Besides, the above-described embodiments of arranging the shields and setting the lower limit of detection can be used separately or in combination. Those skilled in the art can also conceive various variations and alternatives without departing from the general concept of the present invention, which various variations and alternatives are all within the protection scope of this application. The wording "comprise/comprises" does not exclude the presence of elements or steps other than those listed, and the wording "a" or "an" preceding an element does not exclude the presence of a plurality of such elements.

What is claimed is:

1. A system for performing radioactive substance detection and X-ray radiation detection on an object under examination, which comprises:
    an X-ray detection device for performing X-ray radiation imaging examination on the object under examination;
    a radioactive substance monitoring device placed adjacent to the X-ray detection device to detect the radioactive rays emitted by the object under examination;
    characterized in that the radioactive substance monitoring device sets, within the detection energy region thereof, a lower limit of detection to distinguish the energy region of the detected X-rays emitted by the X-ray detection device from the energy region of the radioactive rays emitted by the object under examination, and detects the counting or spectrum of rays in the energy region higher than said lower limit of detection.

2. The system of claim 1, wherein the radioactive substance monitoring device detects the counting of rays in the energy region higher than the lower limit of detection using a single-track counter.

3. The system of claim 2, wherein the lower limit of detection is set dynamically by a digital circuit according to the restriction of energy range and the requirement of sensitivity.

4. The system of claim 1, wherein the radioactive substance monitoring device detects the spectrum of rays in the energy region higher than the lower limit of detection using a multi-track pulse amplitude analyzer.

5. The system of claim 4, wherein the radioactive substance monitoring device filters the distortion effect of the spectrum caused by the X-rays emitted by the X-ray detection device through a digital filtering processing.

6. The system of claim 5, wherein the digital filtering processing includes converting the spectrum using a high pass low cut filter.

7. The system of claim 6, wherein the lower limit of detection is set dynamically by a digital circuit according to the restriction of energy range and the requirement of sensitivity.

8. The system of claim 5, wherein the lower limit of detection is set dynamically by a digital circuit according to the restriction of energy range and the requirement of sensitivity.

9. The system of claim 4, wherein the lower limit of detection is set dynamically by a digital circuit according to the restriction of energy range and the requirement of sensitivity.

10. The system of claim 1, wherein the lower limit of detection is set dynamically by a digital circuit according to the restriction of energy range and the requirement of sensitivity.

11. A method for performing radioactive substance detection and X-ray radiation detection on an object under examination, which comprises:
    performing X-ray radiation detection on the object under examination with an X-ray detection device;
    detecting the radioactive rays emitted by the object under examination with a radioactive substance monitoring device;
    placing the X-ray detection device adjacent to the radioactive substance monitoring device;
    characterized in setting, within the detection energy region of the radioactive substance monitoring device, a lower limit of detection for distinguishing the energy region of the detected X-rays emitted by the X-ray detection device from the energy region of the radioactive rays emitted by the object under examination, and detecting the counting or spectrum of rays in the energy region higher than said lower limit of detection.

12. The method of claim 11, wherein the radioactive substance monitoring device detects the counting in the energy region higher than the lower limit of detection using a single-track counter.

13. The system of claim 12, wherein the lower limit of detection is set dynamically by a digital circuit according to the restriction of energy range and the requirement of sensitivity.

14. The method of claim 11, wherein the radioactive substance monitoring device detects the spectrum in the energy region higher than the lower limit of detection using a multi-track pulse amplitude analyzer.

15. The method of claim 14, wherein the distortion effect of the spectrum caused by the X-rays emitted from the X-ray detection device is filtered by digital filtering processing.

16. The method of claim 15, wherein the digital filtering processing includes converting the spectrum using a high pass low cut filter.

17. The system of claim 16 wherein the lower limit of detection is set dynamically by a digital circuit according to the restriction of energy range and the requirement of sensitivity.

18. The system of claim 15 wherein the lower limit of detection is set dynamically by a digital circuit according to the restriction of energy range and the requirement of sensitivity.

19. The system of claim 14 wherein the lower limit of detection is set dynamically by a digital circuit according to the restriction of energy range and the requirement of sensitivity.

20. The system of claim 11, wherein the lower limit of detection is set dynamically by a digital circuit according to the restriction of energy range and the requirement of sensitivity.

* * * * *